(12) United States Patent
Chen et al.

(10) Patent No.: US 12,035,223 B2
(45) Date of Patent: Jul. 9, 2024

(54) METHOD AND DEVICE FOR WIRELESS TRANSMISSION

(71) Applicant: ESPRESSIF SYSTEMS (SHANGHAI) CO., LTD., Shanghai (CN)

(72) Inventors: Wen Chen, Shanghai (CN); Swee Ann Teo, Shanghai (CN); Jiangjian Jiang, Shanghai (CN); Jiangang Wu, Shanghai (CN); Han Liu, Shanghai (CN)

(73) Assignee: ESPRESSIF SYSTEMS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 18/128,807

(22) Filed: Mar. 30, 2023

(65) Prior Publication Data

US 2023/0239770 A1  Jul. 27, 2023

Related U.S. Application Data

(62) Division of application No. 17/327,423, filed on May 21, 2021, now Pat. No. 11,711,749.

(30) Foreign Application Priority Data

May 22, 2020  (CN) .......................... 202010438605.4

(51) Int. Cl.
| | |
|---|---|
| *H04W 48/10* | (2009.01) |
| *H04L 1/00* | (2006.01) |
| *H04L 5/00* | (2006.01) |
| *H04L 7/04* | (2006.01) |
| *H04W 84/12* | (2009.01) |

(52) U.S. Cl.
CPC ............. *H04W 48/10* (2013.01); *H04L 1/004* (2013.01); *H04L 5/0044* (2013.01); *H04L 7/048* (2013.01); *H04W 84/12* (2013.01)

(58) Field of Classification Search
CPC .......... H04W 84/12; H04L 7/04; H04L 7/048; H04L 7/041; H04L 56/001; H04L 1/0061; H04L 1/0023
See application file for complete search history.

(56) References Cited

U.S. PATENT DOCUMENTS 9,813,725 B1 * 11/2017 Yu ...................... H04N 21/8358
2003/0081592 A1 * 5/2003 Krishnarajah .......... H04L 69/22
370/352

* cited by examiner

*Primary Examiner* — Jamal Javaid
(74) *Attorney, Agent, or Firm* — AIRD & MCBURNEY LP (57) ABSTRACT

A wireless transmission method and a transceiver for wireless transmission are disclosed. According to this method, information to be transmitted and transmission control information are encoded into packet length information of wireless frames for transmission, wherein the transmission control information is filled into synchronization packets, sequence number packets and data packets, and the information to be transmitted is only filled into the data packets. Specifically, the method includes sequentially polling data for transmission in units of transmission sequences, and longitudinally encoding the information to be transmitted and data check information into the data packets. The transmission sequences are separated and sorted by the synchronization packets and the sequence number packets, and the data packets are sorted by sequence number fields in the transmission sequence.

10 Claims, 7 Drawing Sheets

| 2 bytes | 2 bytes | 6 bytes | 6 bytes | 6 bytes | 2 bytes | 6 bytes | 0 to 2312 bytes | 4 bytes |
|---|---|---|---|---|---|---|---|---|
| Frame control field | Duration/ identifier | Address 1 | Address 2 | Address 3 | Sequence control field | Address 4 | Frame body | Check field |

| 2 bytes | 2 bytes | 6 bytes | 6 bytes | 6 bytes | 2 bytes | 6 bytes | 0 to 2312 bytes | 4 bytes |
|---|---|---|---|---|---|---|---|---|
| Frame control field | Duration/ identifier | Address 1 | Address 2 | Address 3 | Sequence control field | Address 4 | Frame body | Check field |

METHOD AND DEVICE FOR WIRELESS TRANSMISSION

CROSS-REFERENCE TO RELATED APPLICATIONS

This application is a divisional of U.S. patent application Ser. No. 17/327,423 filed May 21, 2021, which claims priority to Chinese patent application No. 202010438605.4, filed on May 22, 2020, which are both incorporated by reference herein in their entireties.

TECHNICAL FIELD

The present disclosure relates to the field of network communication, and in particular to a wireless transmission method and apparatus.

BACKGROUND ART

At present, some intelligent hardware products, mainly Wi-Fi products, are not provided with human-machine interfaces, and unlike the products such as computers and mobile phones, such intelligent hardware products cannot provide users with an interface to select Wi-Fi hotspots for connection. How to enable such intelligent devices to be correctly connected to a router is an essential problem to be solved to enable them to be connected to a network. Therefore, a problem to be solved by the present disclosure is to find a secure and reliable method to transmit configuration information such as a Service Set Identifier (SSID) and an access password of a wireless network to such an intelligent device.

As a common practice in the industry, the intelligent hardware is configured to operate in promiscuous mode such that it can receive eligible wireless messages in the air. The SSID and access password are encoded, via a mobile APP (application), into user datagram protocol (UDP) messages for transmitting via wireless broadcast messages or wireless multicast messages. After the wireless messages are received by the intelligent hardware, the intelligent hardware decodes them accordingly to obtain the correct SSID and access password, and then actively connects to a router with the specified SSID to complete the connection.

SUMMARY OF THE INVENTION

An object of the present disclosure is to provide a wireless transmission method and apparatus, which can mainly solve the problems presenting in the prior art, and can reduce latency and technical complexity for a Wi-Fi intelligent device to access a wireless network, and increase success rate of network configuration.

In order to achieve the above object, the technical solution adopted by the present disclosure is to provide a wireless information transmission method (transmitting method) comprising:

step S101) obtaining data to be transmitted, wherein the data to be transmitted is to be carried in packet length information of a plurality of wireless frames, wherein the packet length information of each wireless frame corresponds to a synchronization packet, a sequence number packet, or a data packet, and the data to be transmitted is carried in data packets only;

step S102) dividing the data to be transmitted into a plurality of data groups, wherein each data group is filled into a plurality of data packets in units of bytes, and wherein 8 bits of each byte of the data group are filled into eight different data packets, respectively;

step S103) adding at least one synchronization packet or at least one sequence number packet before a plurality of data packets corresponding to each data group to form a transmission sequence;

step S104) generating packet length information of each wireless frame based on contents of the synchronization packet, the sequence number packet, or the data packets in the transmission sequence, and then generating the wireless frame; and step S105) transmitting the plurality of wireless frames corresponding to a plurality of transmission sequences by polling, in an order that the transmission sequence comprising the synchronization packet information is followed by the transmission sequences comprising the sequence number packet information.

Further, each data group comprises data check information.

Further, the data check information is CRC information.

Further, dividing the data to be transmitted into a plurality of data groups, wherein each data group is filled into a plurality of data packets in units of bytes, and wherein 8 bits of each byte of the data group are filled into eight different data packets, respectively comprises:

dividing the data to be transmitted into the plurality of data groups; calculating the data check information of each data group, and adding the data check information to the data group; and filling the data group with the added data check information into the plurality of data packets in units of bytes, wherein 8 bits of each byte of the data group with the added data check information are filled into the eight different data packets, respectively.

Further, each synchronization packet comprises bits that are divided according to function into a synchronization flag region and a synchronization data region; the synchronization flag region has a length of 2 bits; the synchronization data region has a length equal to the bit length of the synchronization packet minus the length of the synchronization flag region.

Further, wherein the values of the synchronization data regions of the synchronization packets in a same transmission sequence are fixed or changing in a regular pattern; the synchronization packet indicates that the transmission sequence with the synchronization packet is a first transmission sequence.

Further, each sequence number packet comprises bits that are divided according to function into a sequence number flag region and a sequence number data region; the sequence number flag region has a length of 2 bits; the sequence number data region has a length equal to the bit length of the sequence number packet minus the length of the sequence number flag region; and the sequence number data region has a value indicating a position of a subsequent transmission sequence with the sequence number packet in all subsequent transmission sequences.

Further, each data packet comprises bits that are divided according to function into a flag region, a sequence number region, and a data region; the flag region has a length of 2 bits; the sequence number region has a length of at least 3 bits; the data region has a length equal to the bit length of the data packet minus the length of the flag region and the length of the sequence number region; and the sequence number region has a value indicating a position of a data packet with the sequence number region in all data packets included in the transmission sequence.

Further, the information to be transmitted is Wi-Fi configuration information, and the Wi-Fi configuration information comprises an SSID, an access password, and an IP address.

Further, before dividing the data to be transmitted into a plurality of data groups, the method further comprises encrypting the data to be transmitted.

The technical solution adopted by the present disclosure also provides a wireless information transmission method (receiving method), comprising the following steps:

step S201) receiving a wireless frame on a current channel;

step S202) in case that the wireless frame has a packet length information corresponding to a synchronization packet or a sequence number packet, locking on the current channel and proceeding to step S203; otherwise, switching to a next channel and proceeding to step S201;

step S203) receiving a plurality of transmission sequences by polling, labeling the transmission sequence comprising the synchronization packet as a first transmission sequence, labeling each transmission sequence comprising the sequence number packet as a subsequent transmission sequence; receiving all data packets in the plurality of transmission sequences; identifying a plurality of data groups carried in the packet length information of a plurality of wireless frames from the data packets, wherein 8 bits of each byte of each data group are distributed across eight different data packets; and step S204) arranging the data group included in the first transmission sequence at the beginning, arranging the plurality of data groups in the plurality of subsequent transmission sequences in an order according to information of the plurality of sequence number packets; and combining all data groups to obtain information to be transmitted.

Further, each data group comprises data check information.

Further, the data check information is CRC information.

Further, arranging the data group included in the first transmission sequence at the beginning, arranging a plurality of data groups in a plurality of subsequent transmission sequences in an order according to information of a plurality of sequence number packets; and combining all data groups to obtain information to be transmitted comprises:

arranging the data group included in the first transmission sequence at the beginning, and arranging the plurality of data groups in the plurality of subsequent transmission sequences in an order according to information of the plurality of sequence number packets;

checking the data groups using the data check information; and if the check passes, removing the data check information from the data groups, and then combining the data groups with the data check information removed to obtain the information to be transmitted.

Further, each synchronization packet includes bits that are divided according to function into a synchronization flag region and a synchronization data region; the synchronization flag region has a length of 2 bits; and the synchronization data region has a length equal to the bit length of the synchronization packet minus the length of the synchronization flag region.

Further, the values of the synchronization packets of the synchronization data regions in a same transmitting sequence are fixed or changing in a regular pattern; the synchronization packet indicates that the transmission sequence with the synchronization packet is the first transmission sequence.

Further, each sequence number packet comprises bits that are divided according to function into a sequence number flag region and a sequence number data region; the sequence number flag region has a length of 2 bits; the sequence number data region has a length equal to the bit length of the sequence number packet minus the length of the sequence number flag region; and the sequence number data region has a value indicating the position of the subsequent transmission sequence with the sequence number packet in all subsequent transmission sequences.

Further, each data packet comprises bits that are divided according to function into a flag region, a sequence number region, and a data region; the flag region has a length of 2 bits; the sequence number region has a length of at least 3 bits; the data region has a length equal to the bit length of the data packet minus the length of the flag region and the length of the sequence number region; and the sequence number region has a value indicating the position of the data packet with the sequence number region in all data packets included in the transmission sequence.

Further, the information to be transmitted is Wi-Fi configuration information, and the Wi-Fi configuration information comprises an SSID, an access password, and an IP address.

Further, combining all data groups to obtain information to be transmitted comprises: combining all data groups; and decrypting the combined data groups to obtain the information to be transmitted.

The technical solution adopted by the present disclosure also provides a wireless transmission apparatus, comprising a processor and a memory configured to store a computer program, wherein the computer program, when executed by the processor, cause the processor to perform the transmitting method as described above.

The technical solution adopted by the present disclosure also provides a wireless transmission apparatus, comprising a processor and a memory configured to store a computer program, wherein the computer program, when executed by the processor, cause the processor to perform the receiving method as described above.

In view of the above technical features, as non-limiting examples, the present disclosure may provide the following advantages:

1. According to the present disclosure, a longitudinal encoding solution is adopted when encoding data by changing packet length of the wireless frame without splitting a byte stream, which can facilitate the transmission of Unicode characters or data in other formats in units of bytes and improve an encoding efficiency and a decoding efficiency.

2. According to the present disclosure, the synchronization packet, the sequence number packet, and the data packet are distinguished by means of setting flag bits. Compared with the prior art, the sequence number packet has a larger data region (9 bits) and a larger value range ([1,511]) to represent the sequence number of each transmission sequence. Therefore, the maximum transmission capacity of each round of broadcast is much larger as compared with that of the prior art, and more information can be transmitted.

3. According to the present disclosure, each data packet is inserted with check data, and the receiver checks the integrity of the data packet in the received transmission sequence with the check data. After receiving the correct transmission sequence, the receiver may actively skip (rejects) the transmission sequence in subsequent polling by the transmitter to reduce power consumption of the receiver.
4. According to the present disclosure, order of the transmission sequences is indicated with the synchronization packet or the sequence number packets, and order of the data packets in a transmission sequence is indicated with the sequence number regions of the data packets, thereby an out-of-order transmission of data can be detected in time.
5. According to the present disclosure, packets are transmitted in units of transmission sequences, and after data sending and receiving for a plurality of rounds, complete data can still be extracted even in an environment with a high packet loss rate, thereby a success rate of data transmission is increased in a weak network environment, and latency for network provisioning is further shortened.
6. According to the present disclosure, a channel is rapidly locked on with a synchronization frame of fixed-length, or a synchronization frame with a length changing in a regular pattern, so as to distinguish data transmitted in different rounds.

BRIEF DESCRIPTION OF THE DRAWINGS

Reference numerals in the drawings: 11—memory, 12—processor, 21—memory, and 22—processor.

DETAILED DESCRIPTION OF THE PREFERRED EMBODIMENTS

The present disclosure will be further described below with reference to specific embodiments. It should be appreciated that these embodiments are for illustrating the present disclosure only and are not intended to limit the scope thereof. In addition, it should be understood that after reading the contents taught by the present disclosure, those skilled in the art can make various changes and modifications to the present disclosure, and the equivalent forms shall also similarly fall within the scope defined by the appended claims of the present disclosure.

An embodiment of the present disclosure discloses a wireless transmission method to complete wireless network configuration for a device to be networked (i.e., an intelligent device to access a Wi-Fi network) without any requirements for the intelligent device to have any prior knowledge. The device to be networked is an intelligent device without a screen or keyboard for human-machine interaction, such as an intelligent air conditioner, an intelligent light and a smart socket. Without human-machine interface, the device to be networked cannot access a wireless local area network by directly entering an SSID and a password, but can receive wireless messages in promiscuous mode and can further obtain packet length information of a wireless frame received. The device will receive all wireless messages in the promiscuous mode, including those that are not transmitted to the device.

Therefore, the device to be networked switches among different channels in a monitor mode to receive all wireless messages conforming to IEEE 802.11 protocol, obtain Wi-Fi network configuration or provisioning information from them, and then complete configuration of Wi-Fi network with the received configuration information. After the configuration, the device to be networked can switch to station (STA) mode and connects to an access point (AP) to complete the network configuration or provisioning.

In the embodiment, IEEE 802.11 media access control (MAC) frames carry significant information. According to an embodiment of the present disclosure, [a, b] represents a value range, where "a" represents the lower limit of the range and "b" represents the upper limit.

Figure 1:
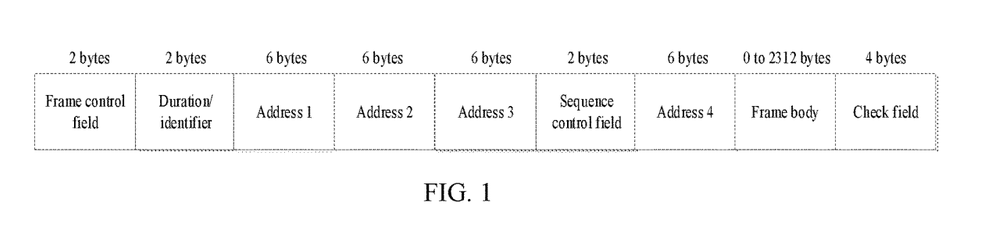
FIG. 1 is a structural diagram of a wireless frame conforming to IEEE 802.11 protocol according to a preferred embodiment of the present disclosure.

For the 802.11 MAC frame as illustrated in FIG. 1, due to restrictions from the operating system, a high privilege is required to modify fields of such a MAC frame other than the frame body. Accordingly, it is difficult for a transmitter to modify these fields at a user software layer. Only the frame body may be easily be controlled by the transmitter. However, with respect to the receiver, it is still difficult to obtain the specific information of the frame body unless the network configuration and association have been completed. Particularly, for an encrypted channel, the frame body is a ciphertext, which cannot be decrypted to a plaintext unless such association has been performed. However, it is easy for the transmitter to control the length information of the frame body by changing a length of a data packet to be sent, and the receiver can obtain the length information of the frame body even if such association has not been performed. In view of this, a wireless transmission method according to the embodiment is provided.

In the embodiment, the size of the frame body of the MAC frame and the length of each wireless packet are limited by a maximum transmission unit (MTU), and the size of data transmission available for software at the application layer is no more than 1,500 bytes. Therefore, in the embodiment, the length of the wireless data packet is limited to have 11 bits, and have a value not greater than 1,500. That is, the length of the wireless frame of a UDP broadcast packet does not exceed 1,500 bytes.

Figure 2:
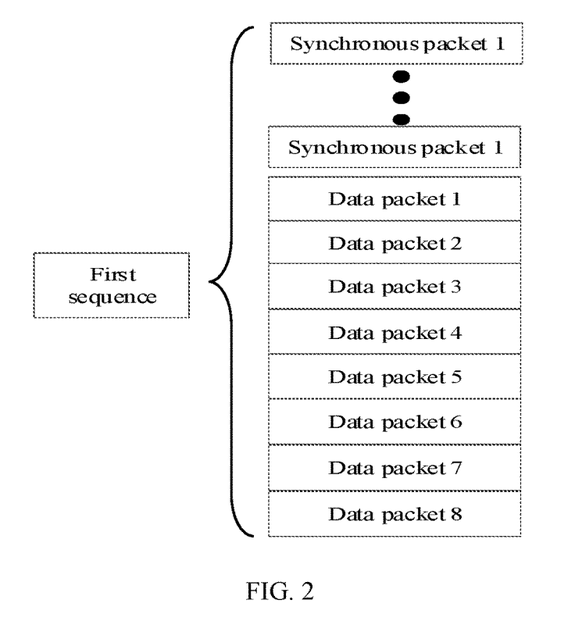
FIG. 2 is a structural diagram of a first transmission sequence according to a preferred embodiment of the present disclosure.
Figure 3:
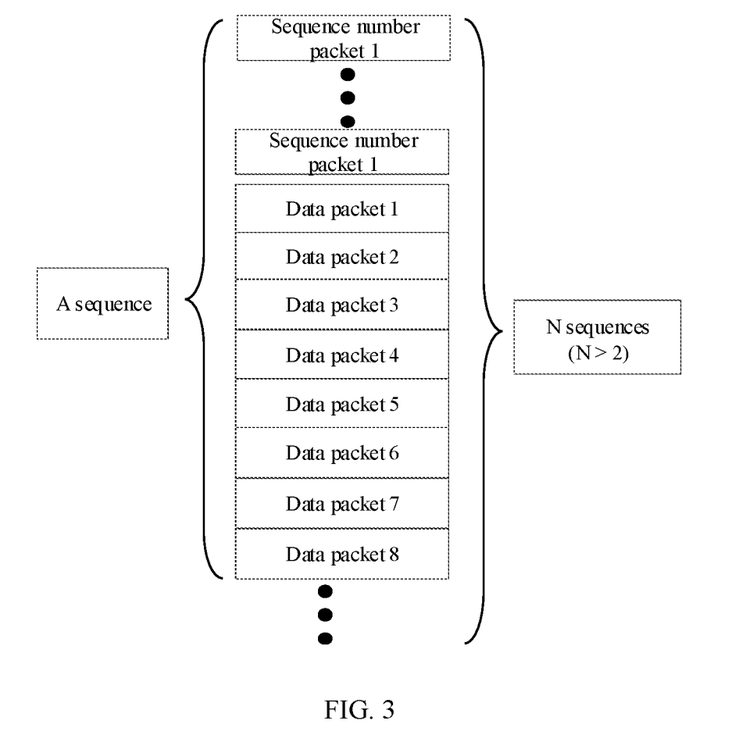
FIG. 3 is a structural diagram of a subsequent transmission sequence according to a preferred embodiment of the present disclosure.

Referring to FIG. 2 and FIG. 3, according to an embodiment of the present disclosure, data to be transmitted is packed into one or more transmission sequences. A transmission sequence may include a plurality of wireless messages, and each transmission sequence is distinguished by at least a synchronization packet or at least a sequence number packet. The data is transmitted in units of transmission sequences at intervals.

During the data transmission, the first transmitted transmission sequence includes at least one synchronization packet and at least eight data packets, and the second and subsequent transmission sequences each includes at least one sequence number packet and at least eight data packets. In an embodiment as shown in FIG. 2, the first transmitted transmission sequence includes a plurality of synchronization packets and eight data packets. In an embodiment as shown in FIG. 3, the second and subsequent transmission sequences each includes a plurality of sequence number packets and at least eight data packets. The receiver identifies the first transmission sequence in the data transmission by identifying the at least one synchronization packet; the order of the second and subsequent transmission sequences is determined according to the sequence number data regions in the sequence number packets. The order of the data packets in each transmission sequence is determined according to the sequence number regions in the data packets.

Figure 4:
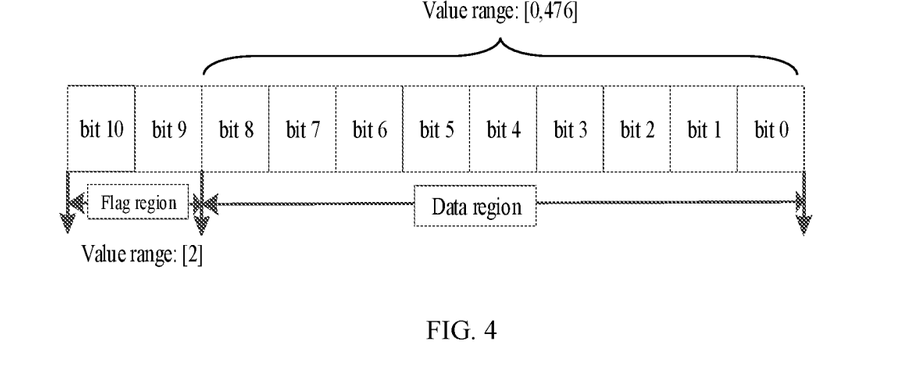
FIG. 4 is a structural diagram of a synchronization packet according to a preferred embodiment of the present disclosure.
Figure 5:
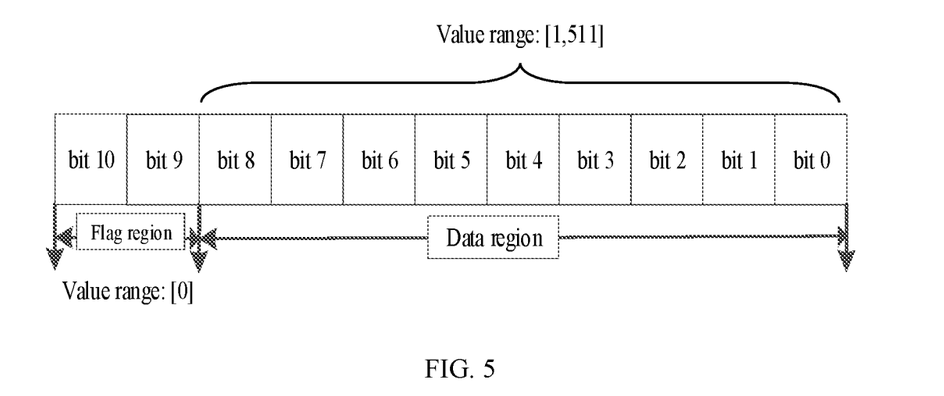
FIG. 5 is a structural diagram of a sequence number packet according to a preferred embodiment of the present disclosure.
Figure 6:
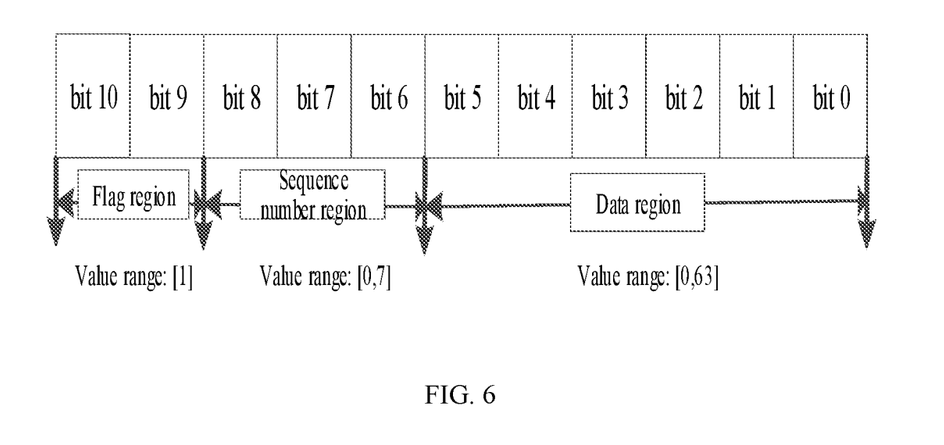
FIG. 6 is a structural diagram of a data packet according to a preferred embodiment of the present disclosure.

Referring to FIG. 4, FIG. 5 and FIG. 6, in an embodiment of the present disclosure, the device to be networked has no knowledge about a specific channel on which the AP broadcasts network configuration information and can only identify the channel of the AP by receiving broadcast messages. Therefore, the device to be networked polls over all available channels within a certain period of time to receive wireless messages from all of the channels. The device be networked receives wireless messages from each channel for a certain period of time every time to detect and identify the presence of the synchronization packets and the sequence number packets from the wireless messages. When the device to be networked detects a valid synchronization packet or sequence number packet on the current channel, it locks on the current channel for subsequent data receiving; otherwise, it switches to a next available channel to continue such detection after a period of time.

In an embodiment as shown in FIG. 4, a synchronization packet includes bits that are divided according to function into a synchronization flag region and a synchronization data region. The 11 bits for representing the length are sorted in ascending order as bit 0, bit 1, bit 2, bit 3, bit 4, bit 5, bit 6, bit 7, bit 8, bit 9, and bit 10, respectively. Among them, bit 0 to bit 8 are associated with the synchronization data region, and bit 9 to bit 10 are associated with the synchronization flag region. The synchronization flag region has a value that is fixed to be 2. As the transmission length of the wireless frame should not exceed 1,500 bytes, the value range of the synchronization data region is set to be [0, 476]. The synchronization packet is used by the communication receiver to lock on the channel.

When a transmission sequence includes more than one synchronization packet, the values of the synchronization data regions of different synchronization packets in the transmission sequence may be one of the following two situations:
1. remaining unchanged; For example, they are fixed to be 1,024; or
2. changing in a regular pattern; For example, the value of the synchronization data region of the first synchronization packet is 1,000, the value of the synchronization data region of the second synchronization packet is 1,004, the value of the synchronization data region of the third synchronization packet is 1,008, and so on.

However, for any two different transmitting sequences, the values of the synchronization data regions of their corresponding synchronization packets may be set in a consistent rule. For example, if, in one wireless transmission, the values of a plurality of synchronization packets in a transmitting sequence are fixed (e.g., 1,024), then a plurality of synchronization packets in all transmission sequences are configured according to the rule, that is, are fixed to be 1,024.

In an embodiment as shown in FIG. 5, a sequence number packet includes bits that are divided according to function into a sequence number flag region and a sequence number data region. The 11 bits for representing the length are sorted in an ascending order as bit 0, bit 1, bit 2, bit 3, bit 4, bit 5, bit 6, bit 7, bit 8, bit 9, and bit 10, respectively. Among them, bit 0 to bit 8 are associated with the sequence number data region, and bit 9 to bit 10 are associated with the sequence number flag region. The sequence number flag region has a value that is fixed to be 0. The sequence number data region has a value within the range of [1, 511].

The sequence number data region has a value to identify the sequence of the second or subsequent transmission sequence in a corresponding wireless transmission. If one transmission sequence includes a plurality of sequence number packets, the sequence number data regions of the sequence number packets belonging to the same transmission sequence have a same value. In one wireless transmission, the second and subsequent transmission sequences are arranged in ascending or descending order according to the values of the sequence number data regions of the sequence number packets contained therein. For two different transmission sequences in one wireless transmission, the values of the sequence number data regions of the sequence number packets contained therein satisfy the following requirements: the value corresponding to a transmission sequence is greater than that the value corresponding to the other transmission sequence arranged before it (ascending order), or the value corresponding to a transmission sequence is lower than that the value corresponding to the other transmission sequence arranged before it (descending order).

For example, with respect to ascending order, if the value of the sequence number data region of the sequence number packet contained in the second transmission sequence is 100, the value of the sequence number data region of the sequence number packet contained in the third transmission sequence may be 200, and the value of the sequence number data region of the sequence number packet contained in the fourth transmission sequence may be 300. With respect to descending order, if the value of the sequence number data region of the sequence number packet contained in the second transmission sequence is 510, the value of the sequence number data region of the sequence number packet contained in the third transmission sequence may be 500, and the value of the sequence number data region of the sequence number packet contained in the fourth transmission sequence may be 490.

A data packet includes bits that are divided according to function into a flag region, a sequence number region, and a data region. The 11 bits for representing the length are sorted in an ascending order as bit 0, bit 1, bit 2, bit 3, bit 4, bit 5, bit 6, bit 7, bit 8, bit 9, and bit 10, respectively. The flag region has a length of 2 bits, which occupies bit 9 and bit 10. The sequence number region has a length of at least 3 bits, which occupies bit 8 to bit 0. The data region has a length equals to the bit length of the data packet minus the length of the flag region and the length of the sequence number region, which occupies the remaining lower bits.

For example, if the sequence number region has a length of 3 bits, the data region has a length of 11 (the total length of the data packet)−2 (the length of the flag region)−3 (the length of the sequence number region)=6 bits; here, the sequence number region occupies bit 8 to bit 6, and the data region occupies the remaining bit 5 to bit 0. Similarly, if the sequence number region has a length of 4 bits, the data region has a length of 11−2−4=5 bits, in which the sequence number region occupies bit 8 to bit 5, and the data region occupies the remaining bit 4 to bit 0, and so on. In practical terms, each data packet transmits at least 1 bit of data information (i.e., 1 data bit), thereby it can be concluded that the maximum length of the sequence number region is as follows: 11−2−1=8 bits.

The sequence number region has a value indicating the position of the data packet with the sequence number region in all data packets contained in the same transmission sequence. The maximum number of data packets carried by one transmission sequence must be within the numerical range identifiable by the sequence number region; otherwise, it is impossible to sort the data packet. Therefore, the longer the sequence number region, the more data packets may be included in one transmission sequence. When the sequence number region has a length of 3 bits, one transmission sequence may carry up to eight data packets; and when the sequence number region has a length of 8 bits, one transmission sequence may carry up to 256 data packets.

In an embodiment as shown in FIG. 6, a design of 3-bit sequence number region is employed, in which bit 0 to bit 5 are associated with the data region, bit 6 to bit 8 are associate with the sequence number region, and bit 9 and bit 10 are associated with the flag region. The flag region of the data packet has a value that is fixed to be 1, the sequence number region has a value within a range that can be represented by a 3-bit binary number, i.e., [0, 7], and the data region has a value within a range that can be represented by a 6-bit binary number, i.e., [0, 63]. The data region is a significant information configuration region for filling, and each data packet may be filled with 6-bit information. The value range of the sequence number region allows the sequence number region to identify up to eight data packets, thus each transmission sequence may carry eight data packets in the embodiment.

Figure 7:
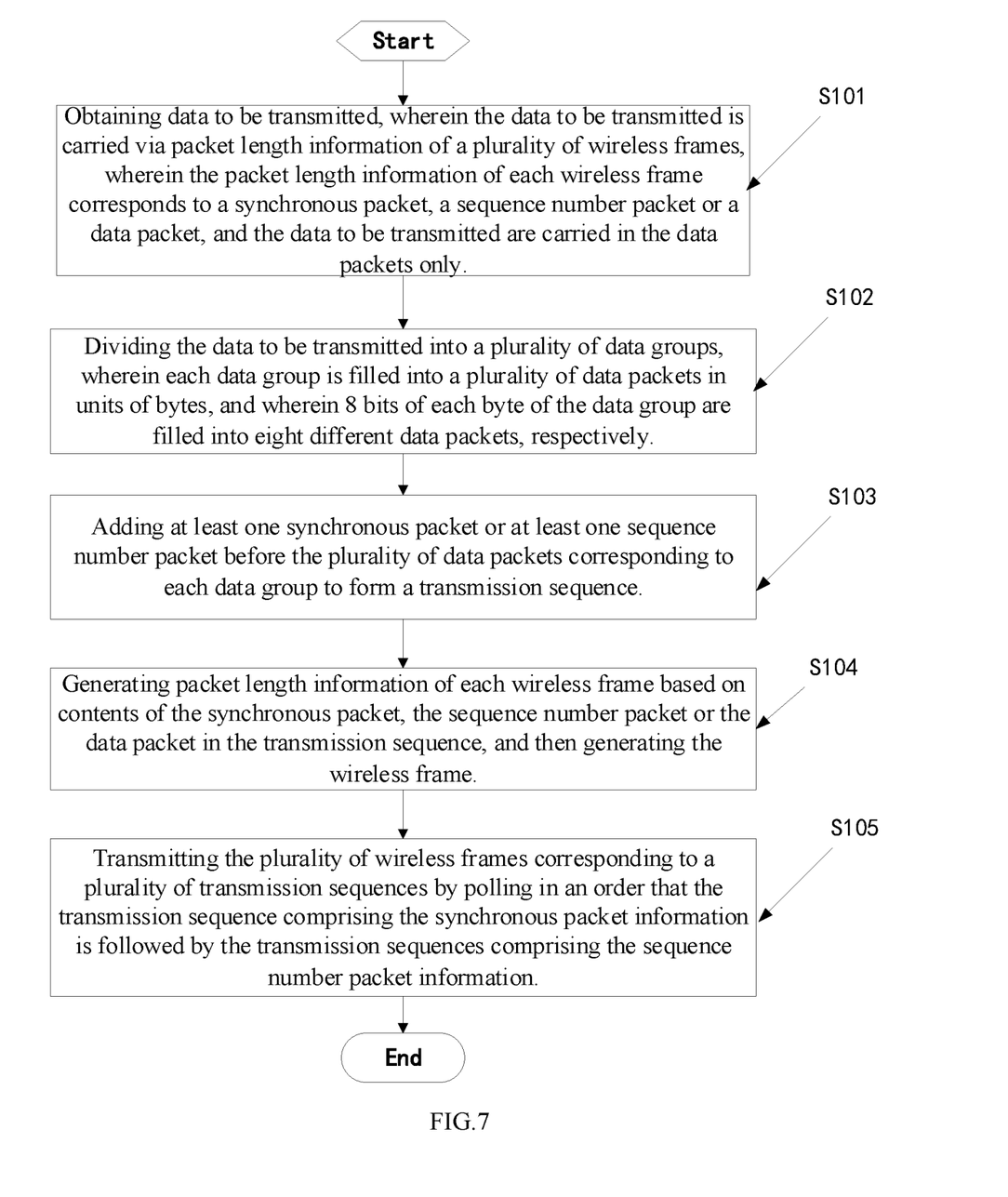
FIG. 7 is a flow chart of a data transmitting process provided according to a preferred embodiment of the present disclosure.

Referring to FIG. 7, a process of a data transmitting method according to an embodiment of the present disclosure may be executed by means of a sending apparatus of a data transmitter, which includes a Wi-Fi module capable of receiving and sending the wireless frames, such as computers and mobile phones. The data transmitting process may include steps S101-S105.

Step S101) data to be transmitted is obtained, in which the data to be transmitted is carried in packet length information of a plurality of wireless frames, and in which the packet length information of each wireless frame corresponds to a synchronization packet, a sequence number packet or a data packet, and the data to be transmitted is carried in data packets only.

In some embodiments, the information to be transmitted includes Wi-Fi configuration information or provisioning information, such as SSIDs, access password, and IP address, or customized information to be transmitted; and the data to be transmitted is carried in packet length information of the wireless frames.

In some embodiments, the obtained data to be transmitted may be encrypted.

In step S102) the data to be transmitted is divided into a plurality of data groups, in which each data group is filled into a plurality of data packets in units of bytes, and 8 bits of each byte of the data group are filled into 8 different data packets, respectively.

In some embodiments, the sequence number region has a value range of [0,7], i.e., one transmission sequence may carry eight data packets. The information to be transmitted is represented with a byte stream, and the lower 6 bits of each data packet are associated with the data region. In view of this, the eight data packets totally carry 6 bytes of information, including 1 byte of CRC and 5 bytes of the information to be transmitted. Bit values from the bit positions of each byte are longitudinally encoded and then filled into the data regions of the data packets.

Figure 8:
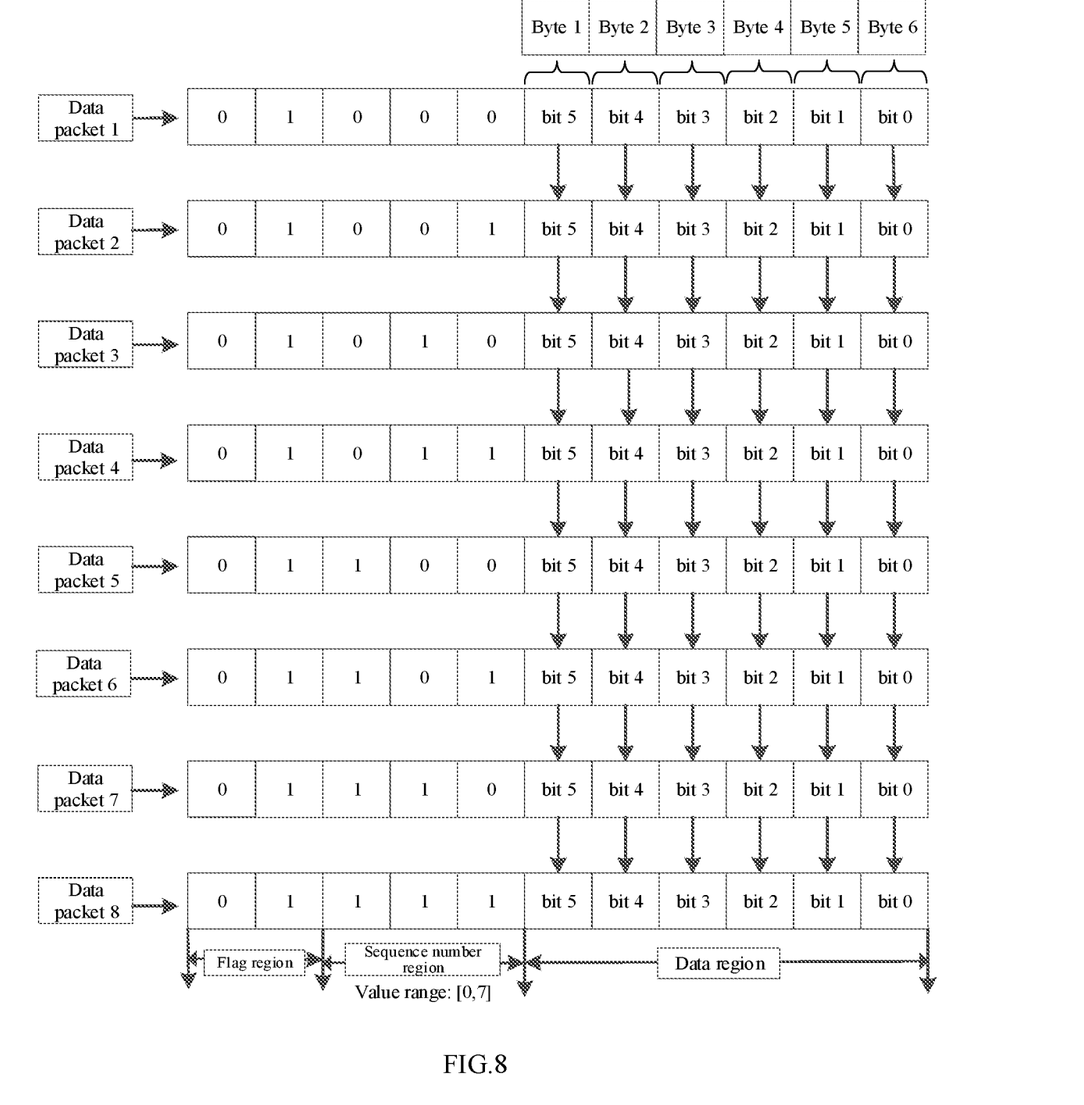
FIG. 8 is a schematic diagram of encoding of data packets when bit stream information is transmitted according to a preferred embodiment of the present disclosure.

Referring to FIG. 8, according to some embodiments, the sequence number region is employed to sequence the data packets of one transmission sequence. As the data is transmitted in units of transmission sequences and each transmission sequence transmits 5-byte information, the total number of data to be transmitted should be an integral multiple of 5 bytes. In case of insufficiency to the integral multiple of 5 bytes, it is necessary to pad bytes to make up to the integral multiple of 5 bytes. The specific data to be padded is a random number between [0, 255]. After padding, the 5-byte integral multiple of information is divided into a plurality of 5-byte groups, and then every 5-byte information is added with 1-byte CRC data to form 6 bytes, which are longitudinally encoded and distributed across eight different data packets of one transmission sequence, and each byte occupies 1 bit in the eight data packets.

In step S103, at least one synchronization packet or at least one sequence number packet is added before a plurality of data packets corresponding to each data group to form a transmission sequence.

In some embodiments, in the process of separating the data to be transmitted into packets to form the transmission sequences, the first transmission sequence is formed by adding at least one synchronization packet before eight data packets, in which the synchronization packet has a synchronization data region with a value of 1,024 or a value changing in a regular pattern. Further, in this process, every subsequent transmission sequence since the second transmission sequence is formed by adding at least one sequence number packet before eight data packets, and the sequence number packet has a sequence number data region with a value indicating the position of the transmission sequence in all transmitted transmission sequences. Addition of every transmission sequence may result in an increment of value in the sequence number data region. The steps above are repeated until all transmission sequences are formed, in which the number of transmission sequences should not exceed the maximum value of 511 that can be represented by the sequence number data region.

In step S104, packet length information of each wireless frame is generated based on contents of the synchronization packet, the sequence number packet or the data packets in the transmission sequence, and then the wireless frame is generated.

In some embodiments, the specific operation is as follows: the information length of a payload part of a UDP message to be transmitted is filled with specific value of every packet of each transmission sequence.

In step S105, the plurality of wireless frames corresponding to a plurality of transmission sequences are transmitted by polling, in an order that the transmission sequence including the synchronization packet information is followed by the transmission sequences including the sequence number packet information.

In some embodiments, transmitting the wireless frames is embodied as follows: transmitting the data to be transmitted in units of transmission sequences, and transmitting the wireless frames corresponding to the transmission sequences in an order that the transmission sequence including the synchronization packet information is followed by the transmission sequences including the sequence number packet information. All of the transmission sequences may need to be transmitted by polling for a period of time in the complicated wireless network environment to avoid wireless data transmission error, packet loss, and interference.

Figure 9:
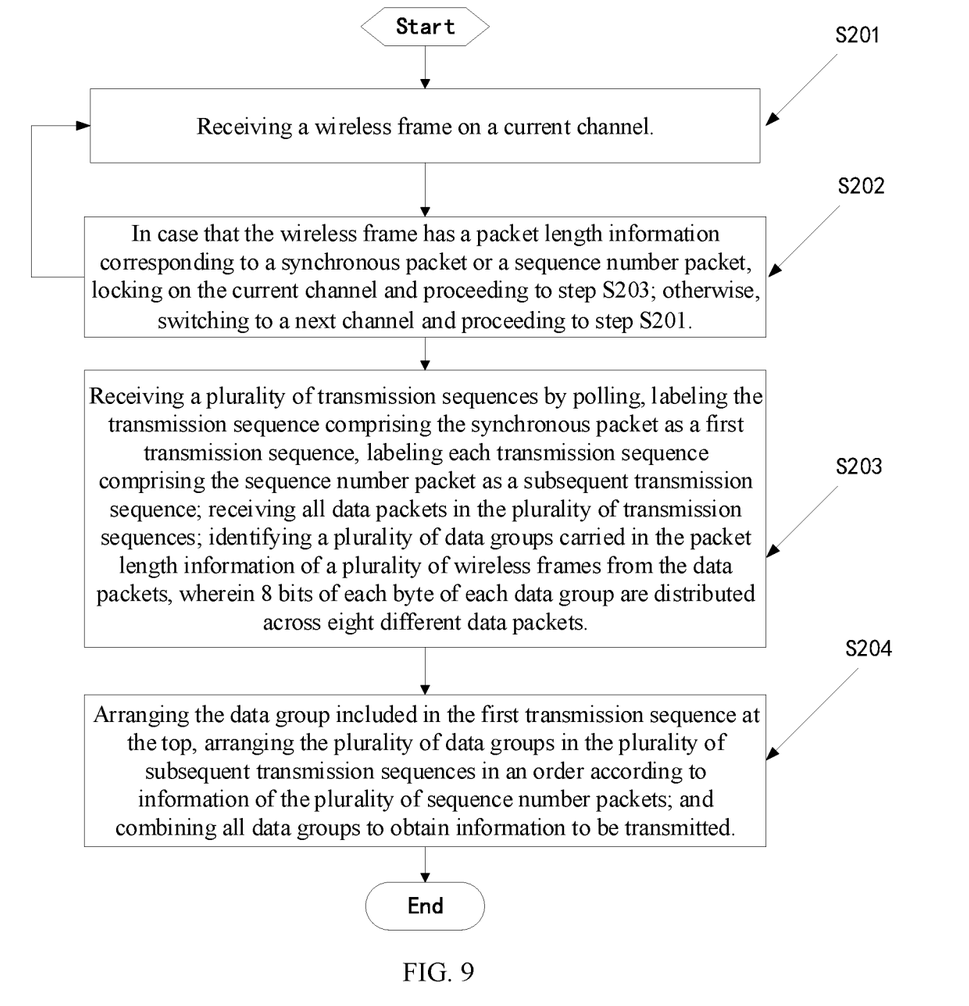
FIG. 9 is a flow chart of a data receiving process provided according to a preferred embodiment of the present disclosure.

Referring to FIG. 9, an embodiment of the present disclosure provides a data receiving process. The data receiving process is performed by a receiving apparatus at a data receiver, such as a smart-home equipment and etc. The receiving apparatus includes a Wi-Fi module configured to receive and process the wireless frames. The data receiving process includes steps S201-S204.

In step S201, a wireless frame is received on a current channel.

In some embodiments, the Wi-Fi module of the receiving apparatus enters monitor mode (promiscuous mode), receives all wireless frames conforming to the IEEE 802.11 protocol in the air, and obtains packet length information of the received wireless frames.

In step S202, in case that the wireless frame has packet length information corresponding to a synchronization packet or a sequence number packet, the current channel is locked on and step S203 is entered. Otherwise, switching to a next channel is performed and step S201 is entered.

In some embodiments, the channel lock-on process is carried out as follows: the receiving end stays on the channel for a short period of time to receive the packets, and calculates the packet length information of the received wireless frame. In case that the packet length information of the wireless frame corresponds to the synchronization packet or the sequence number packet, the current channel is locked on and step S203 is entered. Otherwise, switching to the next channel is performed and step S201 is entered.

In step S203, a plurality of transmission sequences are received by polling, the transmission sequence including the synchronization packet is labeled as a first transmission sequence, each transmission sequence including the sequence number packet is labeled as a subsequent transmission sequence; all data packets in the plurality of transmission sequence are received; and a plurality of data groups carried in the packet length information of a plurality of wireless frames is identified from the data packets; 8 bits of each byte of each data group are distributed across eight different data packets.

In some embodiments, the received wireless data packets are sorted out according to length, and those failing to meet the length requirements will be discarded. For the wireless data packets meeting the length requirements, it is required to distinguish the sequence number packet or the synchronization packet of the transmission sequence first, and then receive the data packets to be transmitted. The transmission sequence including the synchronization packet is labeled as the first transmission sequence, and each transmission sequence including the sequence number packet is labeled as the subsequent transmission sequence; all data packets in the transmission sequences are received.

Figure 10:
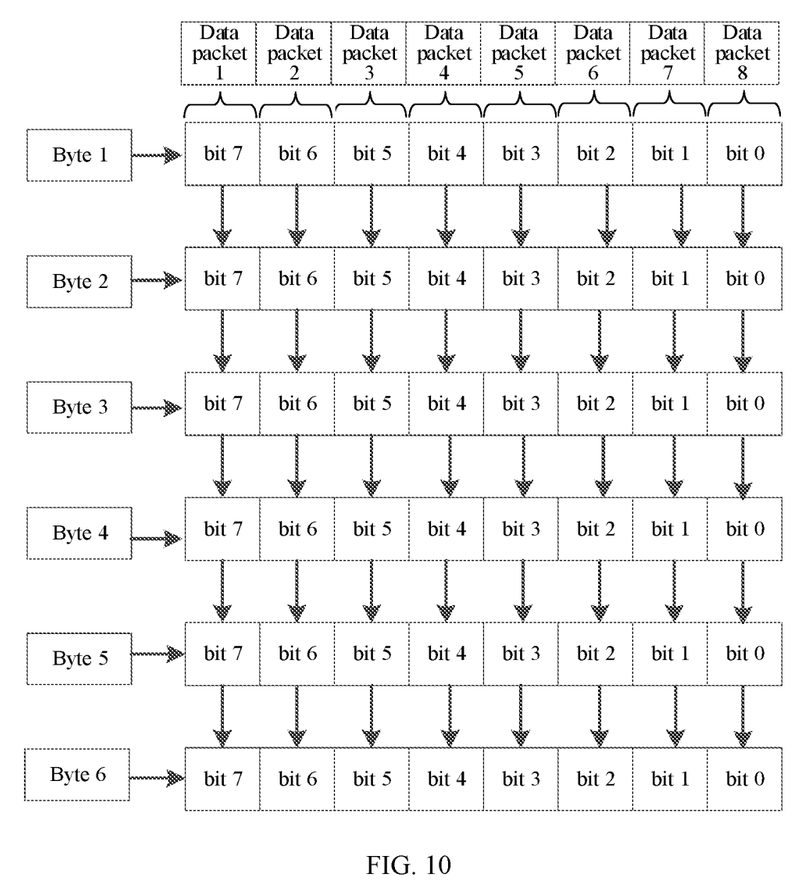
FIG. 10 is a schematic diagram of encoding of data packets when bit stream information is received according to a preferred embodiment of the present disclosure.

The data groups carried in the packet length information of the wireless frame are identified from the data packet. The data groups are encoded longitudinally, i.e., 8 bits of each byte are distributed in eight different data packets. Referring to FIG. 10, one byte of information can be obtained by combining the bit values from an identical bit position in the data regions of eight data packets of a same transmission sequence, and totally six bytes of information are obtained, one of them is a CRC value. The received transmission sequence is verified by calculating a CRC value of the other 5 bytes and comparing it with the obtained CRC value. If the transmission sequence is received correctly, the message thereof may be rejected subsequently; otherwise, the transmission sequence should be received continuously and the data packets therein should be replaced until the whole transmission sequence is received correctly.

In step S204, the data group included in the first transmission sequence is arranged at the beginning, the data groups in the plurality of subsequent transmission sequences are arranged in an order according to information of the sequence number packets; and all information of the plurality of data groups are combined to obtain information to be transmitted.

In some embodiments, the data group included in the first transmission sequence is arranged at the beginning, and the data groups in the subsequent transmission sequences are arranged in an order according to the information of the sequence number packets; and the check information (CRC byte) is removed from the data groups, and then the remaining bytes are combined to obtain the information to be transmitted.

In some embodiments, after the remaining bytes are combined, the combined bytes are decrypted to obtain the information to be transmitted.

Figure 11:
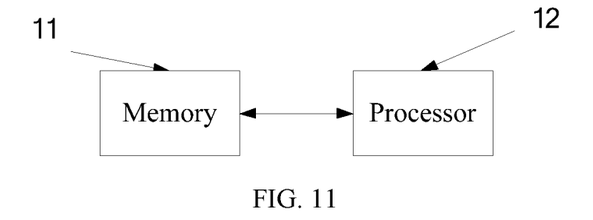
FIG. 11 is a schematic diagram of a wireless transmission apparatus for transmitting data according to a preferred embodiment of the present disclosure.

Referring to FIG. 11, the technical solution adopted by the present disclosure also provides a wireless transmission apparatus which includes a memory 11 and a processor 12. The memory 11 stores a computer program, and when the computer program is executed by the processor 12, the processor 12 is caused to perform the transmitting method as described above.

Figure 12:
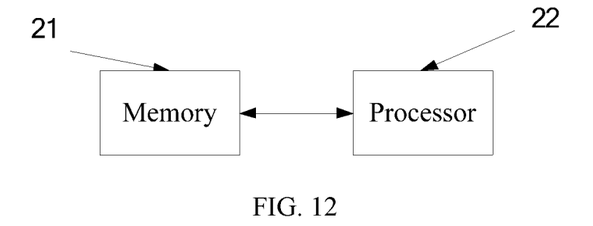
FIG. 12 is a schematic diagram of a wireless transmission apparatus for receiving data according to a preferred embodiment of the present disclosure.

Referring to FIG. 12, the technical solution adopted by the present disclosure also provides a wireless transmission apparatus which includes a memory 21 and a processor 22. The memory 21 stores a computer program, and when the computer program is performed by the processor 22, the processor 22 is caused to perform the receiving method as described above.

It should be understood by those skilled in the art that embodiments of the present disclosure may be provided as methods, apparatuses or computer program products. Therefore, the present disclosure may adopt hardware embodiments, software embodiments, or a combination of software and hardware embodiments.

Computer-readable storage media include non-volatile and volatile media, removable and non-removable media, and may implement information storage in any method or technology. The information includes computer-readable instructions, data structures, program devices or other data.

The example of computer storage media includes, but not limited to phase-change random access memory (PRAM), static random access memory (SRAM), dynamic random access memory (DRAM), other types of random access memory (RAM), read only memory (ROM), electrically erasable programmable read-only memory (EEPROM), flash memory or other memory technologies, compact disk read only memory (CD-ROM), digital versatile disc (DVD) or other optical memories, cassette magnetic tape, tape, disk memory or other magnetic memory device or any other non-transmission media, and available for storing information accessible by the computing devices.

It is noted that the present disclosure may be carried out in software and/or a combination of software and hardware. For example, the present disclosure is implemented by means of an application specific integrated circuit (ASIC), a general-purpose computer or any other similar hardware devices. In some embodiments, the software program of the present disclosure may be executed by means of the processor to implement the above-described steps or functions. Similarly, the software program of the present disclosure (including related data structures) may be stored in computer-readable recording media, such as RAM memory, magnetic or optical drive or floppy disk and similar devices. In addition, some steps or functions of the present disclosure may be carried out by means of hardware, such as a circuit cooperating with the processor to execute various steps or functions.

The above description involves preferred embodiments of the present disclosure only, and therefore does not limit the patent scope of the present disclosure. All equivalent structures or equivalent process changes made by using the specification and drawings of the present disclosure, or direct or indirect application to other related technical fields, shall be similarly incorporated into the patent protection scope of the present disclosure.

The invention claimed is:

1. A wireless information transmission method, comprising the following steps:
   receiving a wireless frame on a current channel;
   in case that the wireless frame has a packet length information corresponding to a synchronization packet or a sequence number packet, locking on the current channel and proceeding to a next step; otherwise, switching to a next channel and proceeding to the receiving the wireless frame step;
   receiving a plurality of transmission sequences by polling, labeling the transmission sequence comprising the synchronization packet as a first transmission sequence, labeling each transmission sequence comprising the sequence number packet as a subsequent transmission sequence; receiving all data packets in the plurality of transmission sequences; identifying a plurality of data groups carried in the packet length information of a plurality of wireless frames from the data packets, wherein 8 bits of each byte of each data group are distributed across eight different data packets; and
   arranging the data group included in the first transmission sequence at the beginning, arranging the plurality of data groups in the plurality of subsequent transmission sequences in an order according to information of the plurality of sequence number packets; and combining all data groups to obtain information to be transmitted.

2. The wireless transmission method according to claim 1, wherein each data group comprises data check information, wherein the data check information is cyclic redundancy check (CRC) information.

3. The wireless transmission method according to claim 2, wherein arranging the data group included in the first transmission sequence at the beginning, arranging a plurality of data groups in a plurality of subsequent transmission sequences in an order according to information of a plurality of sequence number packets; and combining all data groups to obtain information to be transmitted comprises:
   arranging the data group included in the first transmission sequence at the beginning, and arranging the plurality of data groups in the plurality of subsequent transmission sequences in an order according to information of the plurality of sequence number packets;
   checking the data groups using the data check information; and if the check passes, removing the data check information from the data groups, and then combining the data groups with the data check information removed to obtain the information to be transmitted.

4. The wireless transmission method according to claim 1, wherein each synchronization packet includes bits that are divided into a synchronization flag region and a synchronization data region; the synchronization flag region has a length of 2 bits; and the synchronization data region has a length equal to the bit length of the synchronization packet minus the length of the synchronization flag region.

5. The wireless transmission method according to claim 4, wherein the values of the synchronization packets of the synchronization data regions in a same transmitting sequence are fixed or changing in a regular pattern; the synchronization packets indicate that the transmission sequence with the synchronization packets is the first transmission sequence.

6. The wireless transmission method according to claim 1, wherein each sequence number packet comprises bits that are divided into a sequence number flag region and a sequence number data region; the sequence number flag region has a length of 2 bits; the sequence number data region has a length equal to the bit length of the sequence number packet minus the length of the sequence number flag region; and
   the sequence number data region has a value indicating the position of the subsequent transmission sequence with the sequence number packet in all subsequent transmission sequences.

7. The wireless transmission method according to claim 1, wherein each data packet comprises bits that are divided into a flag region, a sequence number region, and a data region; the flag region has a length of 2 bits; the sequence number region has a length of at least 3 bits; the data region has a length equal to the bit length of the data packet minus the length of the flag region and the length of the sequence number region; and
   the sequence number region has a value indicating the position of the data packet with the sequence number region in all data packets included in the transmission sequence.

8. The wireless transmission method according to claim 1, wherein the information to be transmitted is Wi-Fi configuration information, wherein the Wi-Fi configuration information comprises a Service Set Identifier (SSID) an access password, and an internet protocol (IP) address.

9. The wireless transmission method according to claim 1, wherein combining all data groups to obtain information to be transmitted comprises: combining all data groups; and decrypting the combined data groups to obtain the information to be transmitted.

10. A wireless transmission apparatus, comprising:
   a processor; and a memory;

wherein the memory is configured to store a computer program, wherein the computer program, when executed by the processor, causes the processor to:

receive a wireless frame on a current channel;

in case that the wireless frame has a packet length information corresponding to a synchronization packet or a sequence number packet, lock on the current channel and proceeding to the next step; otherwise, switch to a next channel and proceeding to the previous step;

receive a plurality of transmission sequences by polling, label the transmission sequence comprising the synchronization packet as a first transmission sequence, and label each transmission sequence comprising the sequence number packet as a subsequent transmission sequence; receive all data packets in the plurality of transmission sequences; identify a plurality of data groups carried in the packet length information of a plurality of wireless frames from the data packets, wherein 8 bits of each byte of each data group are distributed across eight different data packets; and arrange the data group included in the first transmission sequence at the beginning, arrange the plurality of data groups in the plurality of subsequent transmission sequences in an order according to information of the plurality of sequence number packets; and combine all data groups to obtain information to be transmitted.

\* \* \* \* \*